US012735030B2

(12) United States Patent
Kim

(10) Patent No.: US 12,735,030 B2
(45) Date of Patent: Sep. 15, 2026

(54) DRIVING ASSISTANCE APPARATUS IN VIEW OF LANE CURVATURE DETERMINATION AND METHOD OF CONTROLLING THE SAME

(71) Applicant: HL KLEMOVE CORP., Incheon (KR)

(72) Inventor: Yonghwan Kim, Seoul (KR)

(73) Assignee: HL KLEMOVE CORP., Incheon (KR)

( * ) Notice: Subject to any disclaimer, the term of this patent is extended or adjusted under 35 U.S.C. 154(b) by 251 days.

(21) Appl. No.: 18/599,223

(22) Filed: Mar. 8, 2024

(65) Prior Publication Data

US 2025/0074409 A1 Mar. 6, 2025

(30) Foreign Application Priority Data

Aug. 29, 2023 (KR) ........................ 10-2023-0113907

(51) Int. Cl.

| | |
|---|---|
| ***B60W 30/12*** | (2020.01) |
| ***G06T 7/64*** | (2017.01) |
| ***G06V 10/776*** | (2022.01) |
| ***G06V 20/56*** | (2022.01) |

(52) U.S. Cl.

CPC ............... *B60W 30/12* (2013.01); *G06T 7/64* (2017.01); *G06V 10/776* (2022.01); *G06V 20/588* (2022.01); *B60W 2420/403* (2013.01); *B60W 2552/10* (2020.02); *B60W 2552/30* (2020.02); *G06T 2207/30256* (2013.01)

(58) Field of Classification Search

CPC ........... B60W 2552/30; B60W 40/072; B60W 2552/20

See application file for complete search history.

(56) References Cited

U.S. PATENT DOCUMENTS

| | | | | |
|---|---|---|---|---|
| 11,164,011 | B2 | 11/2021 | Min | |
| 2001/0053955 | A1* | 12/2001 | Shirai | B60K 31/0066 701/400 |
| 2020/0064855 | A1* | 2/2020 | Ji | G05D 1/0246 |
| 2021/0213930 | A1* | 7/2021 | Sengupta | B60R 11/04 |
| 2021/0322550 | A1* | 10/2021 | Kameoka | A61K 39/3955 |

FOREIGN PATENT DOCUMENTS

| | | |
|---|---|---|
| KR | 10-2018-0070385 | 6/2018 |
| KR | 10-2296520 | 9/2021 |

* cited by examiner

*Primary Examiner* — Kenneth J Malkowski

(74) *Attorney, Agent, or Firm* — WOMBLE BOND DICKINSON (US) LLP

(57) ABSTRACT

A driving assistance apparatus includes one or more sensing devices installed on a vehicle and configured to acquire detection data with an outward field of sensing view from the vehicle, and a processor electrically or communicatively connected to the one or more sensing devices, wherein the processor acquires current curvature information about a traveling lane of the vehicle based on output data of the one or more sensing devices, and verifies validity of the current curvature information about the traveling lane based on a comparison between the current curvature information about the traveling lane and previous curvature information about the traveling lane.

15 Claims, 4 Drawing Sheets

ACQUIRE CURRENT CURVATURE INFORMATION ABOUT TRAVELING LANE OF VEHICLE — 201

COMPARE CURRENT CURVATURE INFORMATION ABOUT TRAVELING LANE TO PREVIOUS CURVATURE INFORMATION ABOUT TRAVELING LANE — 203

VERIFY VALIDITY OF CURRENT CURVATURE INFORMATION ABOUT TRAVELING LANE BASED ON COMPARISON — 205

DRIVING ASSISTANCE APPARATUS IN VIEW OF LANE CURVATURE DETERMINATION AND METHOD OF CONTROLLING THE SAME

CROSS-REFERENCE TO RELATED APPLICATION

This application claims the priority to and benefit of Korean Patent Application No. 10-2023-0113907, filed on Aug. 29, 2023 in the Korean Intellectual Property Office, the disclosure of which is incorporated herein by reference in its entirety.

BACKGROUND

1. Field

Embodiments of the present disclosure relate to a driving assistance apparatus to which a lane recognition technology is applied, and a method of controlling the same.

2. Description of the Related Art

Recently, research on vehicles equipped with an advanced driver assist system (ADAS) for actively providing information about a vehicle state, a driver state, and/or a nearby environment in order to reduce a driver's burden and enhance convenience has been actively conducted.

Examples of the ADAS mounted to vehicles include lane departure warning (LDW), lane keeping assist (LKA), high beam assist (HBA), automatic emergency braking (AEB), traffic sign recognition (TSR), adaptive cruise control (ACC), blind spot detection (BSD), and the like.

The conventional ADAS recognizes a travel lane of a vehicle based on an output signal of a sensing device and uses the recognized traveling lane to control the vehicle.

In addition, when a curvature value of the traveling lane is changed suddenly, the conventional ADAS stops the execution of a function for controlling the vehicle, which is being executed while the vehicle travels, based on lane recognition information.

Therefore, conventionally, there is a problem in that in a lane recognition process, when the curvature value of the lane is incorrectly recognized as being changed suddenly unlike a real situation, the ADAS performs a malfunction of stopping the execution of the function for controlling the vehicle based on the lane recognition information.

Therefore, a technology for preventing the problem is required, but related technologies have not been developed yet.

SUMMARY

Therefore, it is an aspect of the present disclosure to provide a driving assistance apparatus for verifying the validity of recognized lane information and controlling a vehicle based on the verification of the validity, and a method of controlling the same.

For example, the driving assistance apparatus and the method of controlling the same may compare currently recognized traveling lane information to previously recognized traveling lane information and verify the validity of the currently recognized traveling lane information.

The traveling lane information may include curvature information (e.g., a curvature value) of the traveling lane, and the driving assistance apparatus and the method of controlling the same may verify the validity of whether curvature information of the currently recognized traveling lane is normal information or abnormal information.

In addition, the driving assistance apparatus and the method of controlling the same can prevent a malfunction of stopping the execution of a vehicle control function, which is being executed, based on lane recognition information by applying replacement curvature information when the curvature information of the currently recognized traveling lane is abnormal information.

In accordance with one aspect of the present disclosure, a driving assistance apparatus includes one or more sensing devices installed on a vehicle and configured to acquire detection data with an outward field of sensing view from the vehicle, and a processor electrically or communicatively connected to the one or more sensing devices, wherein the processor acquires current curvature information about a traveling lane of the vehicle based on output data of the one or more sensing devices, and verifies validity of the current curvature information about the traveling lane based on a comparison between the current curvature information about the traveling lane and previous curvature information about the traveling lane.

The processor may output signals for controlling the vehicle based on the current curvature information about the traveling lane when the current curvature information about the traveling lane is valid.

The processor may determine that the current curvature information about the traveling lane is valid when a difference value between a first curvature value included in the current curvature information about the traveling lane and a second curvature value included in the previous curvature information about the traveling lane is smaller than a predetermined first error reference value.

The processor may verify validity of current curvature information about an opposite lane in a direction opposite to a direction of the traveling lane of the vehicle when the current curvature information about the traveling lane is not valid, and output signals for controlling the vehicle based on the current curvature information about the opposite lane when the current curvature information about the opposite lane is valid.

The processor may determine that the current curvature information about the opposite lane is valid when a difference value between a third curvature value included in the current curvature information about the opposite lane and a fourth curvature value included in previous curvature information about the opposite lane is smaller than a predetermined second error reference value.

The processor may replace the first curvature value included in the current curvature information about the traveling lane with the third curvature value and output signals for controlling the vehicle based on the first curvature value replaced with the third curvature value when the current curvature information about the opposite lane is valid.

The one or more sensing devices may include a camera, the current curvature information about the traveling lane may include curvature information about the lane in a first image frame at a current time point acquired through the camera, and the previous curvature information about the traveling lane may include curvature information about the traveling lane in a predetermined number of second image frames acquired immediately before the first image frame.

The processor may store a fifth curvature value included in curvature information of the traveling lane in a third image frame acquired immediately before the second image frame in a memory as a reference value when the current curvature information about the opposite lane is valid, determine whether a result value reflecting a predetermined margin value in an average value of the third curvature value and the reference value is smaller than or equal to a second curvature value included in the previous curvature information about the traveling lane, and cancel the replacement of the first curvature value with the third curvature value and output signals for controlling the vehicle based on the first curvature value of which the replacement with the third curvature value has been cancelled when the result value is smaller than or equal to the second curvature value.

The processor may delete the margin value stored in the memory in response to the output of the signals based on the first curvature value of which the replacement with the third curvature value has been cancelled.

The processor may re-perform an operation of replacing the first curvature value with the third curvature value included in the current curvature information about the opposite lane when the result value is larger than the second curvature value.

The signals for controlling the vehicle may include a signal for controlling a lane keeping assist function of the vehicle, and the processor may verify validity of the current curvature information about the traveling lane while executing the lane keeping assist function.

The processor may stop the execution of the lane keeping assist function when the current curvature information about the opposite lane is not valid.

In accordance with another aspect of the present disclosure, a method of controlling a driving assistance apparatus includes acquiring current curvature information about a traveling lane of a vehicle based on output data of one or more sensing devices of the vehicle, and verifying validity of the current curvature information about the traveling lane based on a comparison between the current curvature information about the traveling lane and previous curvature information about the traveling lane.

The method may further include outputting signals for controlling the vehicle based on the current curvature information about the traveling lane when the current curvature information about the traveling lane is valid.

The verifying of the validity of the current curvature information about the traveling lane may include determining that the current curvature information about the traveling lane is valid when a difference value between a first curvature value included in the current curvature information about the traveling lane and a second curvature value included in the previous curvature information about the traveling lane is smaller than a predetermined first error reference value.

The method may further include verifying validity of current curvature information about an opposite lane in a direction opposite to a direction of the traveling lane of the vehicle when the current curvature information about the traveling lane is not valid, and outputting signals for controlling the vehicle based on the current curvature information about the opposite lane when the current curvature information about the opposite lane is valid.

The verifying of the validity of the current curvature information about the opposite lane may include determining that the current curvature information about the opposite lane is valid when a difference value between a third curvature value included in the current curvature information about the opposite lane and a fourth curvature value included in previous curvature information about the opposite lane is smaller than a predetermined second error reference value.

The outputting of the signals for controlling the vehicle based on the current curvature information about the opposite lane may include replacing the first curvature value included in the current curvature information about the traveling lane with the third curvature value and outputting the signals for controlling the vehicle based on the first curvature value replaced with the third curvature value when the current curvature information about the opposite lane is valid.

The one or more sensing devices may include a camera, the current curvature information about the traveling lane may include curvature information about the lane in a first image frame at a current time point acquired through the camera, and the previous curvature information about the traveling lane may include curvature information about the traveling lane in a predetermined number of second image frames acquired immediately before the first image frame.

The outputting of the signals for controlling the vehicle based on the current curvature information about the opposite lane may include storing a fifth curvature value included in curvature information of the traveling lane in a third image frame acquired immediately before the second image frame in a memory as a reference value when the current curvature information about the opposite lane is valid, determining whether a result value reflecting a predetermined margin value in an average value of the third curvature value and the reference value is smaller than or equal to a second curvature value included in the previous curvature information about the traveling lane, and cancelling the replacement of the first curvature value with the third curvature value and outputting signals for controlling the vehicle based on the first curvature value of which the replacement with the third curvature value has been cancelled when the result value is smaller than or equal to the second curvature value.

BRIEF DESCRIPTION OF THE DRAWINGS

These and/or other aspects of the disclosure will become apparent and more readily appreciated from the following description of the embodiments, taken in conjunction with the accompanying drawings of which.

DETAILED DESCRIPTION

Figure 1:
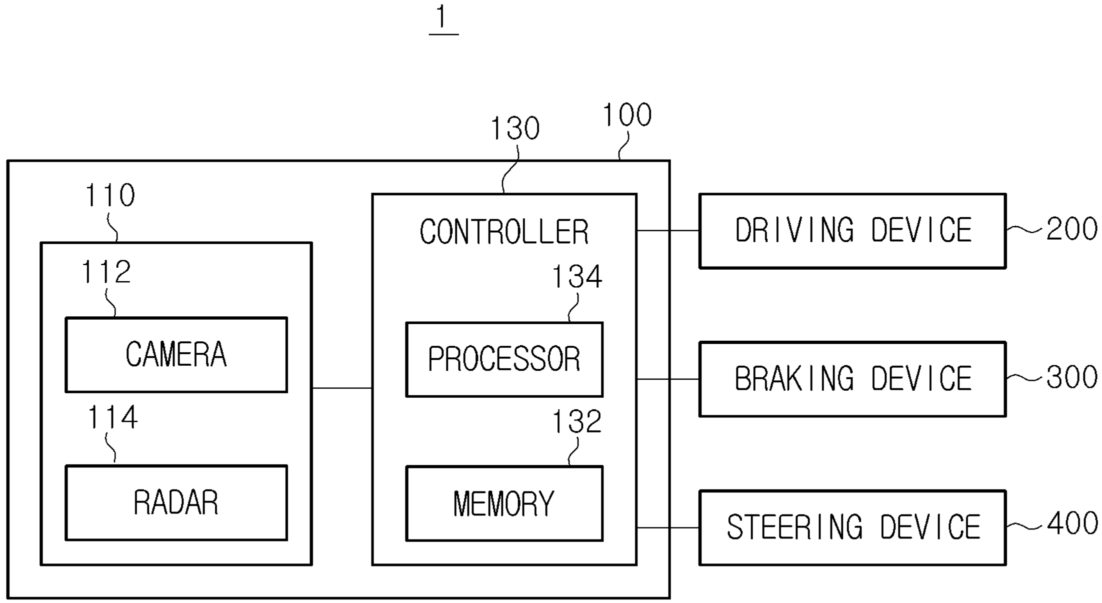
FIG. 1 is a view illustrating a configuration of a vehicle including a driving assistance apparatus according to one embodiment.

Like reference numerals refer to like components throughout the specification. This specification does not describe all the components of the embodiments, and duplicative contents between embodiments or general contents in the technical field of the present disclosure will be omitted. The terms 'part,' 'module,' 'member,' and 'block' used in this specification may be embodied as software or hardware, and it is also possible for a plurality of 'parts,' 'modules,' 'members,' and 'blocks' to be embodied as one component, or one 'part,' 'module,' 'member,' and 'block' to include a plurality of components according to embodiments.

Throughout the specification, when a part is referred to as being 'connected' to another part, it includes not only a direct connection but also an indirect connection, and the indirect connection includes connecting through a wireless network.

Also, when it is described that a part 'includes' a component, it means that the part may further include other components, not excluding the other components unless specifically stated otherwise.

Throughout the specification, when a member is described as being 'on' another member, this includes not only a case in which the member is in contact with the other member but also a case in which another member is present between the two members.

The terms first, second, etc. are used to distinguish one component from another component, and the components are not limited by the above-mentioned terms.

The singular forms 'a,' 'an,' and 'the' include plural referents unless the context clearly dictates otherwise.

In each operation, an identification numeral is used for convenience of explanation, the identification numeral does not describe the order of the operations, and each operation may be performed differently from the order specified unless the context clearly states a particular order.

The present disclosure may provide a driving assistance apparatus, which, when a curvature value of a traveling lane (or also referred to as a travel lane) of a vehicle increases suddenly, determines that it is an abnormal state and uses a replacement value that may replace the curvature value of the traveling lane to control the vehicle, and a method of controlling the same. Therefore, according to the driving assistance apparatus and the method of controlling the same according to embodiments of the present disclosure, it is possible to prevent the vehicle from being incorrectly controlled on a lane of a real road in a situation in which information of the traveling lane is incorrect.

Hereinafter, an operation principle and embodiments of the disclosure will be described with reference to the accompanying drawings.

FIG. 1 is a view illustrating a configuration of a vehicle including a driving assistance apparatus according to one embodiment.

Referring to FIG. 1, a vehicle 1 may include a driving assistance apparatus 100, a driving device 200, a braking device 300, and/or a steering device 400.

For example, components (e.g., the driving assistance apparatus 100, the driving device 200, the braking device 300, and/or the steering device 400) of the vehicle 1 may be connected via a vehicle communication network and/or a hard wire, which will be described below.

The driving assistance apparatus 100 may perform a driving assistance function for a driver.

For example, the driving assistance apparatus 100 may provide various functions for the safety to the driver.

For example, when there is a zone in which the vehicle 1 may be parked and/or stopped, the driving assistance apparatus 100 may provide an emergency stop function (or also referred to as a stop function) for stopping the vehicle 1 in the zone.

In addition, for example, the driving assistance apparatus 100 may provide functions of lane departure warning (LDW), lane keeping assist (LKA), high beam assist (HBA), autonomous emergency braking (AEB), traffic sign recognition (TSR), adaptive cruise control (ACC), blind spot detection (BSD) and the like.

The driving assistance apparatus 100 may include one or more sensing devices 110 and/or a controller 130.

The one or more sensing devices 110 and/or the controller 130 may be connected through the vehicle communication network and/or the hard wire, which will be described below.

At least one of the one or more sensing devices 110 and the controller 130 may not be essential components of the driving assistance apparatus 100. For example, at least one of the at least one of the one or more sensing devices 110 and the controller 130 may be omitted from the driving assistance apparatus 100.

The one or more sensing devices 110 may be installed on the vehicle 1 and may provide object data with an outward field of sensing view from the vehicle 1.

The one or more sensing devices 110 may include a camera 112 and/or a radar 114.

The camera 112 may capture an area around the vehicle 1 and acquire image data around the vehicle 1.

For example, the camera 112 may include a front camera installed on the vehicle 1 to face forward from the vehicle 1.

For example, the camera 112 may include a plurality of lenses (not illustrated), an image sensor (not illustrated), and/or an image processor (not illustrated).

The radar 114 may transmit transmission radio waves outward from the vehicle 1 and detect external objects of the vehicle 1 based on reflected radio waves reflected from the external objects.

In addition, although not illustrated, the one or more sensing devices 110 may further include a light detection and ranging (LiDAR).

The controller 130 may control the one or more sensing devices 110, the driving device 200, the braking device 300, and/or the steering device 400.

The controller 130 may include a memory 132 and/or a processor 134.

The memory 132 may store a software program for the driving assistance apparatus 100.

The memory 132 may store a program and/or data for processing each data (e.g., first object data, second object data, or data received from an external device and/or the input device).

The memory 132 may temporarily record each data and temporarily record a result of processing each data by the processor 134.

The memory 132 may include not only volatile memories such as a static random access memory (SRAM) and a dynamic RAM (DRAM) but also non-volatile memories such as a flash memory, a read only memory (ROM), and an erasable programmable ROM (EPROM).

The processor 134 may process each data and provide a signal for controlling each of the driving device 200, the braking device 300, and/or the steering device 400 to the corresponding device. For example, the processor 134 may include a micro control unit (MCU).

The processor 134 may evaluate risk of collision between the vehicle 1 and nearby objects through data (e.g., classification, relative positions, and relative speeds of the nearby objects) acquired through the one or more sensing devices 110, for example, the camera 112 and/or the radar 114. For example, the processor 134 may calculate a time to collision (TTC) (or a distance to collision (DTC)) between the vehicle 1 and the nearby object based on the position (distance) and the relative speed of the nearby object of the vehicle 1 and evaluate risk of collision between the vehicle 1 and the nearby object based on the TTC. The processor 134 may determine that the shorter the TTC, the higher the risk of collision.

The processor 134 may select a target object among the nearby objects of the vehicle 1 based on the risk of collision, for example, the TTCs between the vehicle 1 and the nearby objects.

The processor 134 may generate a driving signal, a braking signal, and/or a steering signal based on the risk of collision with the target object. For example, the processor 134 may warn a driver of collision or transmit the braking signal to the braking device 300 based on a comparison between the TTCs between the vehicle 1 and the target objects and a reference time. In addition, the processor 134 may transmit the steering signal to the steering device 400 in order to avoid the collision with the target object based on the comparison between the TTCs between the vehicle 1 and the target objects and the reference time.

The processor 134 may acquire current curvature information about a traveling lane of the vehicle 1 based on output data of the one or more sensing devices 110 and verify validity of the current curvature information about the traveling lane of the vehicle 1.

The processor 134 may determine the validity of the current curvature information about the traveling lane of the vehicle, that is, whether the current curvature information is normal based on a history of curvature information acquired before acquiring the current curvature information with respect to the traveling lane of the vehicle 1 in order to prevent an instantaneous change in the curvature value of the traveling lane due to a recognition error of the curvature information from being reflected in control of the vehicle 1.

For example, the processor 134 may verify the validity of the current curvature information about the traveling lane of the vehicle 1 based on a comparison between current curvature information acquired at a current time point and previous curvature information acquired at a time point immediately before the current time point with respect to the traveling lane of the vehicle 1.

When the current curvature information about the traveling lane of the vehicle 1 is valid, the processor 134 may output (or provide) signals for controlling the vehicle 1 to the driving device 200, the braking device 300, and/or the steering device 400 based on the current curvature information about the traveling lane of the vehicle 1.

For example, the signals for controlling the vehicle 1 may include a signal for controlling a lane keeping assist function of the vehicle 1 and/or a signal for controlling a vehicle control function based on lane information of the vehicle 1, such as a highway driving pilot (HDP) function.

The lane keeping assist function of the vehicle 1 may include the functions of the LDW, the LKA, and/or a lane following assist (LFA).

When the current curvature information about the traveling lane of the vehicle 1 is changed suddenly, the processor 134 may use current curvature information about an opposite lane in a direction opposite to a direction of the traveling lane of the vehicle 1 to control the vehicle 1 instead of the current curvature information about the traveling lane of the vehicle 1.

For example, when the current curvature information about the traveling lane of the vehicle 1 is not valid and the current curvature information about the opposite lane in a direction opposite to the direction of the traveling lane of the vehicle 1 is valid, the processor 134 may output the signals for controlling the vehicle 1 to the driving device 200, the braking device 300, and/or the steering device 400 based on the current curvature information about the opposite lane.

In addition, when the current curvature information about the traveling lane of the vehicle 1 is not valid and the current curvature information about the opposite lane in a direction opposite to the direction of the traveling lane of the vehicle 1 is valid, the processor 134 may record curvature information acquired before acquiring the current curvature information in the memory 132 as a reference value (or also referred to as an index value).

In addition, based on the reference value recorded in the memory 132, the processor 134 may determine whether to continuously use the current curvature information about the opposite lane to control the vehicle 1 or to re-use the current curvature information about the traveling lane of the vehicle 1 to control the vehicle 1.

For example, while outputting the signals for controlling the vehicle 1 based on the current curvature information about the opposite lane, the processor 134 may determine whether a result value reflecting a margin value in an average value of the current curvature information about the traveling lane of the vehicle 1 and the reference value stored in the memory 132 is smaller than or equal to a curvature value included in the current curvature information about the opposite lane currently in use.

In addition, when the result value is smaller than or equal to the curvature value included in the current curvature information about the opposite lane currently in use, the processor 134 may cancel (or also referred to as stop) the use of the current curvature information about the opposite lane to control the vehicle 1 and output a signal that allows the current curvature information about the traveling lane of the vehicle 1 to be used to control the vehicle.

The driving device 200 may move the vehicle 1 and include, for example, an engine (not illustrated), an engine management system (EMS) (not illustrated), a transmission (not illustrated), and a transmission control unit (TCU) (not illustrated). The engine may generate power for the vehicle 1 to travel, and the EMS may control the engine in response to a driver's acceleration intention conveyed through an accelerator pedal or a request of the driving assistance apparatus 100. The transmission may transmit the power generated by the engine to wheels for deceleration, and the TCU may control the transmission in response to a driver's transmission instruction conveyed through a transmission lever and/or a request of the driving assistance apparatus 100.

The braking device 300 may stop the vehicle 1 and include, for example, a brake caliper (not illustrated) and an electronic brake control module (EBCM) (not illustrated). The brake caliper may decelerate the vehicle 1 or stop the vehicle 1 using friction with a brake disk, and the EBCM may control the brake caliper in response to a driver's braking intention conveyed through a brake pedal and/or a request of the driving assistance apparatus 100. For example, the EBCM may receive a deceleration request including a deceleration from the driving assistance apparatus 100 and electrically or hydraulically control the brake caliper so that the vehicle 1 decelerates depending on the requested deceleration.

The steering device 400 may include an electronic power steering control module (EPS) (not illustrated) and/or an electronic stability control module (ESC) (not illustrated). The steering device 400 may change a travel direction of the vehicle 1, and the EPS may assist with an operation of the steering device 400 so that the driver may easily manipulate a steering wheel in response to the driver's steering intention conveyed through a steering wheel. In addition, the EPS may control the steering device 400 in response to a request of the driving assistance apparatus 100. For example, the EPS may receive a steering request including a steering torque from the driving assistance apparatus 100 and control the steering device 400 to steer the vehicle 1 based on the requested steering torque. The ESC may assist with the operation of the steering device 400 so that the driver may maintain the lane without losing the ability to steer the vehicle 1 while the driver performs a sudden steering operation and/or drives the vehicle 1 on a curved road.

Figure 2:
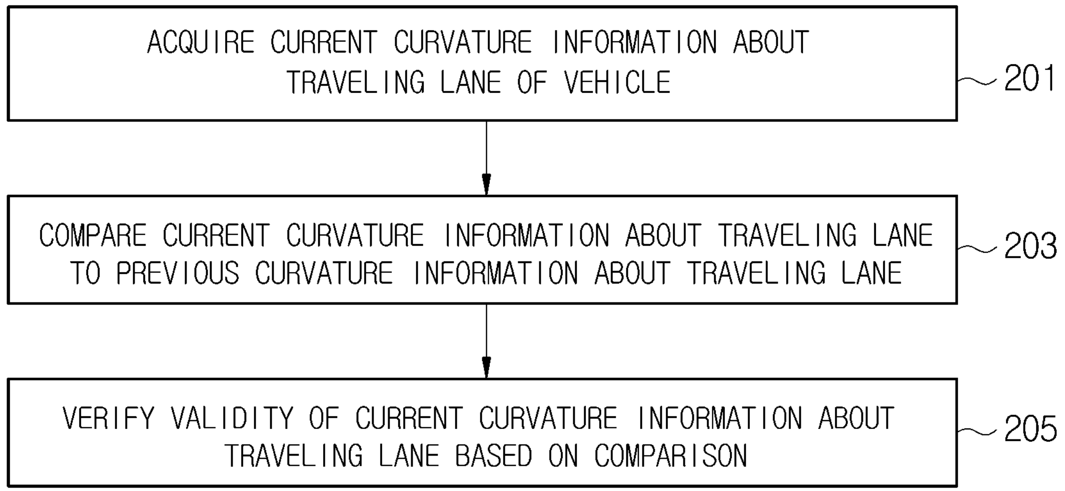
FIG. 2 is a flowchart of an operation of the driving assistance apparatus according to one embodiment.

FIG. 2 is a flowchart of an operation of the driving assistance apparatus (and/or the controller 130 and/or the processor 134) according to one embodiment.

Referring to FIG. 2, the driving assistance apparatus 100 may acquire the current curvature information about the traveling lane of the vehicle 1 based on the output data from the one or more sensing devices 110 (201).

The driving assistance apparatus 100 may acquire the current curvature information about the traveling lane of the vehicle 1 while executing the lane keeping assist function of the vehicle 1 and/or the autonomous driving function (e.g., the HDP function) of the vehicle 1.

The driving assistance apparatus 100 may compare the current curvature information about the traveling lane of the vehicle 1 to previous curvature information about the traveling lane of the vehicle 1 (203).

The driving assistance apparatus 100 may verify the validity of the current curvature information about the traveling lane of the vehicle 1 based on the comparison between the current curvature information and the previous curvature information about the traveling lane of the vehicle 1 (205).

The driving assistance apparatus 100 may calculate a difference value between a first curvature value included in the current curvature information about the traveling lane of the vehicle 1 and a second curvature value included in the previous curvature information about the traveling lane of the vehicle 1.

For example, the driving assistance apparatus 100 may calculate a difference value between a first curvature value included in curvature information about the lane in a first image frame at a current time point acquired through the camera 112 and a second curvature value included in curvature information about the traveling lane in a predetermined number of second image frames acquired immediately before the first image frame. The driving assistance apparatus 100 may determine whether the calculated difference value is smaller than a predetermined first error reference value.

When the difference value between the first curvature value and the second curvature value is smaller than the predetermined first error reference value, the driving assistance apparatus 100 may determine that the current curvature information about the traveling lane of the vehicle 1 is valid (or also referred to as normal information).

When the difference value between the first curvature value and the second curvature value is larger than or equal to the predetermined first error reference value, the driving assistance apparatus 100 may determine that the current curvature information about the traveling lane of the vehicle 1 is not valid (or also referred to as abnormal information).

Meanwhile, in addition to the embodiment of FIG. 2, when the current curvature information about the traveling lane of the vehicle 1 is valid, the driving assistance apparatus 100 may output the signals for controlling the vehicle 1 based on the current curvature information about the traveling lane of the vehicle 1.

For example, the signals for controlling the vehicle 1 may include the signals for controlling the lane keeping assist function of the vehicle 1 and/or the autonomous driving function (e.g., the HDP function) of the vehicle 1.

In addition, in addition to the embodiment of FIG. 2, when the current curvature information about the traveling lane of the vehicle 1 is not valid, the driving assistance apparatus 100 may verify the validity of the current curvature information about the opposite lane in a direction opposite to the direction of the traveling lane of the vehicle 1.

For example, when a difference value between a third curvature value included in the current curvature information about the opposite lane and a fourth curvature value included in previous curvature information about the opposite lane is smaller than a predetermined second error reference value, the driving assistance apparatus 100 may determine that the current curvature information about the opposite lane of the vehicle 1 is valid (or also referred to as normal information).

In addition, when the difference value between the third curvature value and the fourth curvature value is larger than or equal to the predetermined second error reference value, the driving assistance apparatus 100 may determine that the current curvature information about the opposite lane is not valid (or also referred to as abnormal information).

In addition, in addition to the embodiment of FIG. 2, when the current curvature information about the opposite lane is valid according to a result of verifying the validity of the current curvature information about the opposite lane, the driving assistance apparatus 100 may output signals for controlling the vehicle 1 based on the current curvature information about the opposite lane.

For example, when the current curvature information about the opposite lane is valid, the driving assistance apparatus 100 may replace the first curvature value included in the current curvature information about the traveling lane with the third curvature value and output the signals for controlling the vehicle based on the first curvature value replaced with the third curvature value.

When the current curvature information about the opposite lane is not valid, the driving assistance apparatus 100 may stop the execution of the control function of the vehicle 1 currently executed.

For example, when performing the operations of the embodiment of FIG. 2 while executing the lane keeping assist function of the vehicle 1 and/or the autonomous driving function (e.g., the HDP function) of the vehicle 1, the driving assistance apparatus 100 may output a control signal to stop the execution of the function currently executed when the current curvature information about the opposite lane is not valid.

Figure 3A:
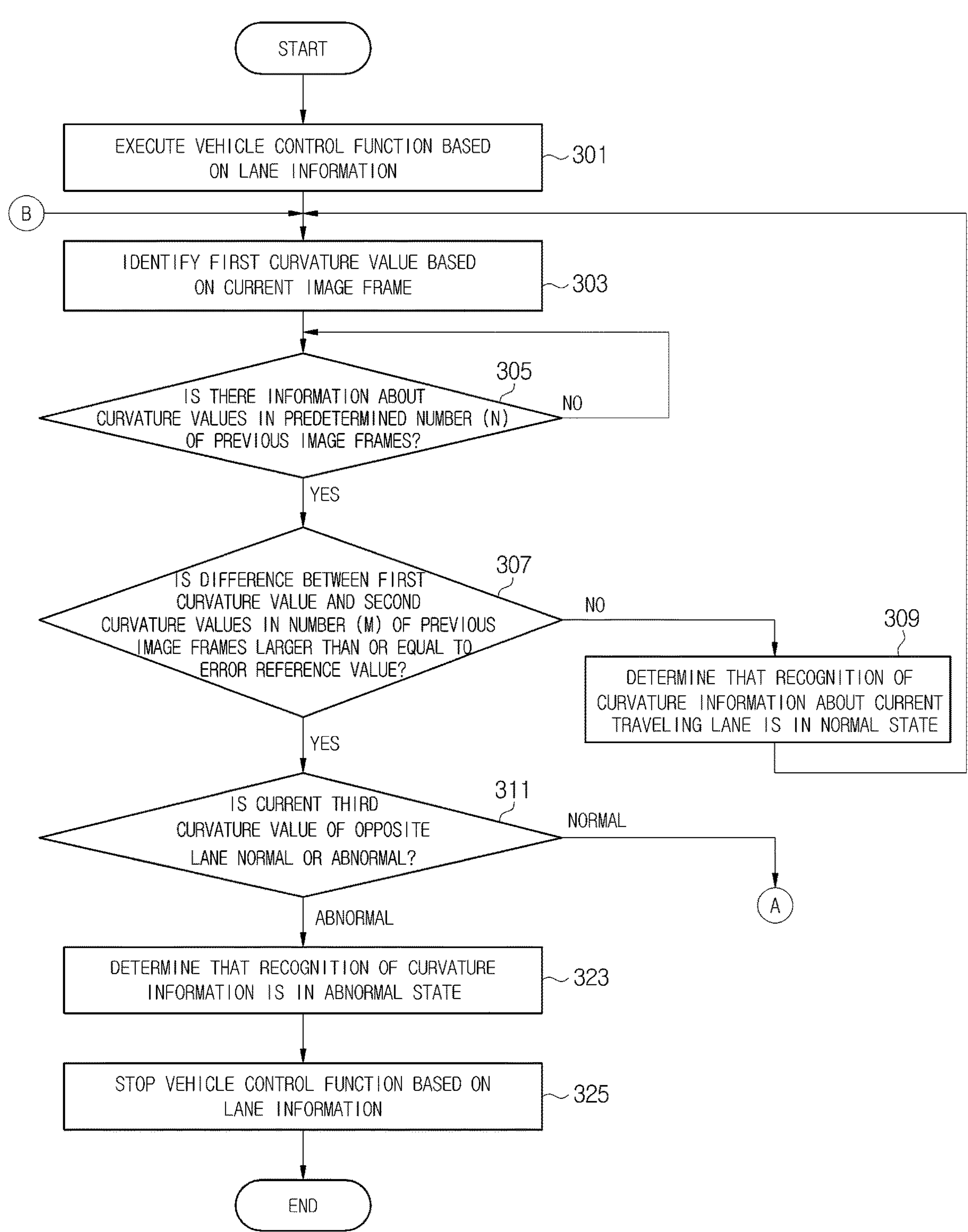
FIGS. 3A and 3B are flowcharts of the operation of the driving assistance apparatus according to one embodiment.
Figure 3B:
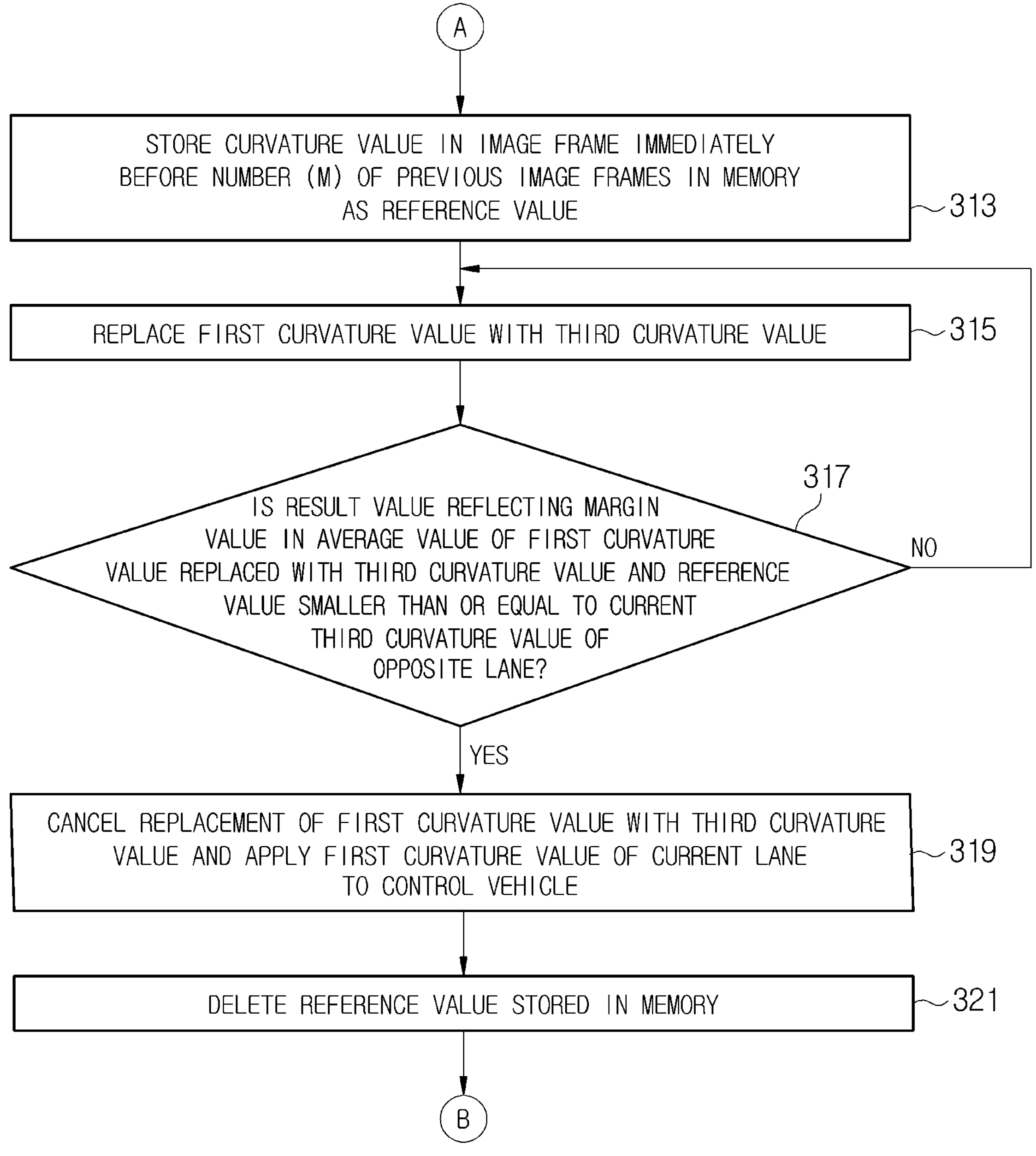

FIGS. 3A and 3B are flowcharts of an operation of the driving assistance apparatus (and/or the controller 130 and/or the processor 134) according to one embodiment.

Referring to FIGS. 3A and 3B, the driving assistance apparatus 100 may execute the vehicle control function based on the lane information (301).

The vehicle control function based on the lane information may include the lane keeping assist function of the vehicle 1 and/or the autonomous driving function (e.g., the HDP function) of the vehicle 1.

The driving assistance apparatus 100 may identify a first curvature value based on a current image frame acquired through the camera 112 (303).

The driving assistance apparatus 100 may acquire an image frame through the camera 112 while the vehicle 1 travels.

The current image frame acquired through the camera 112 includes image data of the traveling lane of the vehicle 1, and the first curvature value is a current curvature value of the traveling lane of the vehicle 1.

The driving assistance apparatus 100 may determine whether there is information about curvature values in a predetermined number (N) (N is a natural number) of previous image frames, which have been acquired immediately before the current image frame (305).

The driving assistance apparatus 100 may perform operation 307 when there is the information about the curvature values in a predetermined number (N) of previous image frames and otherwise, re-perform operation 305.

The driving assistance apparatus 100 may determine whether a difference between the first curvature value in the current image frame and second curvature values in a predetermined number (M) (M=N−1) of previous image frames immediately before the current image frame is larger than or equal to a predetermined error reference value (307).

When the difference between the first curvature value and the second curvature value is larger than or equal to the predetermined error reference value, the driving assistance apparatus 100 may perform operation 311 and otherwise, perform operation 309.

When M is larger than 1, a difference between the first curvature value and second curvature values in a predetermined number (k) or more of image frames among second curvature values in a plurality of image frames is larger than or equal to the error reference value, the driving assistance apparatus 100 may perform operation 311 and otherwise, perform operation 309.

The driving assistance apparatus 100 may determine that the recognition of the curvature information about the current traveling lane is in a normal state (309).

The driving assistance apparatus 100 may re-perform operation 303 after determining that the recognition of the curvature information about the current traveling lane is in a normal state.

The driving assistance apparatus 100 may determine (or also referred to as verify validation) whether a current third curvature value of the opposite lane in a direction opposite to the direction of the traveling lane of the vehicle 1 is normal or abnormal (311).

When a difference value between a third curvature value in a current image frame including image data of the opposite lane and fourth curvature values in a predetermined number (M) of previous image frames immediately before the current image frame of the opposite lane is smaller than the predetermined error reference value, the driving assistance apparatus 100 may determine that the third curvature value is normal and otherwise, determine that the third curvature value is abnormal.

When M is larger than 1, a difference between the third curvature value and fourth curvature values in a predetermined number (k) or more of image frames among fourth curvature values in the plurality of previous image frames is smaller than the reference value, the driving assistance apparatus 100 may determine that the third curvature value is normal and otherwise, determine that the third curvature value is abnormal.

When the third curvature value of the opposite lane is normal, the driving assistance apparatus 100 may perform operation 313 and otherwise, perform operation 323.

The driving assistance apparatus 100 may store a curvature value in an image frame immediately before a number (M) of previous image frames in the memory 132 as the reference value (313).

The reference value may be a value for determining whether to continuously use the current curvature information about the opposite lane to control the vehicle 1 or whether to re-use the current curvature information about the traveling lane of the vehicle 1 to control the vehicle 1 according to operations to be described below of the driving assistance apparatus 100.

The driving assistance apparatus 100 may replace the first curvature value with the third curvature value (315).

As the driving assistance apparatus 100 replaces the first curvature value with the third curvature value, the driving assistance apparatus 100 may output the signals for controlling the vehicle 1 based on the first curvature value replaced with the third curvature value.

The driving assistance apparatus 100 may determine whether the result value reflecting the predetermined margin value in the average value of the first curvature value replaced with the third curvature value and the reference value is smaller than or equal to the current third curvature value of the opposite lane (317).

For example, the reflecting of the predetermined margin value in the average value may include performing an operation of multiplying the average value by the predetermined margin value or performing an operation of adding the predetermined margin value to the average value.

When the result value is smaller than or equal to the current third curvature value of the opposite lane, the driving assistance apparatus 100 may perform operation 319 and otherwise, re-perform operation 315.

The driving assistance apparatus 100 may cancel the replacement of the first curvature value with the third curvature value and apply the first curvature value of the current lane to control the vehicle (319).

When the result value is smaller than or equal to the current third curvature value of the opposite lane, the driving assistance apparatus 100 may stop the use of the current third curvature value of the opposite lane to control the vehicle 1, that is, stop outputting the signals for controlling the vehicle 1 based on the first curvature value replaced with the third curvature value and output the signals for controlling the vehicle 1 based on the current first curvature value of the traveling lane of the vehicle 1.

The driving assistance apparatus 100 may delete the reference value stored in the memory 132 (321).

The driving assistance apparatus 100 may determine that the recognition of the curvature information is in an abnormal state (323).

The driving assistance apparatus 100 may stop the vehicle control function based on the lane information in response to the determination that the recognition of the curvature information is in an abnormal state (325).

Meanwhile, in addition to the embodiment of FIG. 3, when determining that the recognition of the curvature information of the current traveling lane is in a normal state according to operation 309, the driving assistance apparatus 100 may output the signals for controlling the vehicle 1 based on the first curvature value of the current traveling lane, that is, the signals for executing the vehicle control function based on the lane information.

As is apparent from the above description, according to the driving assistance apparatus 100 and the method of controlling the same according to the embodiments, when the reliability of stability of the curvature information about the traveling lane acquired based on the data received from the sensing device 110 is degraded (or not valid), it is possible to prevent a problematic matter that the control function of the vehicle 1 under control is unintentionally stopped and accidents of the vehicle 1 that may be caused by the problematic matter.

For example, according to the driving assistance apparatus 100 and the method of controlling the same, when the reliability of stability of the acquired curvature information about the traveling lane is degraded, it is possible to maintain the execution of the control function of the vehicle 1 under control based on replacement curvature information to replace the corresponding curvature information without immediately stopping the execution of the control function of the vehicle 1 under control.

In addition, according to the driving assistance apparatus 100 and the method of controlling the same, when the reliability of the acquired curvature information about the traveling lane is recovered, it is possible to use the curvature information about the traveling lane recognized as normal to control the vehicle 1.

For example, the control of the vehicle 1 may include the control of the lane keeping assist function (e.g., the functions of the LDW, the LKA, and/or the LFA) of the vehicle 1.

In addition, the control of the vehicle 1 may include the HDP function in the case of a road without lane lines in a construction section on a highway.

Meanwhile, the disclosed embodiments may be implemented in the form of a recording medium that stores instructions executable by a computer. The instructions may be stored in the form of program codes, and when executed by a processor, the instructions may perform operations of the disclosed embodiments by generating a program module. The recording medium may be implemented as a computer-readable recording medium.

The computer-readable recording medium may include all kinds of recording media storing instructions that can be interpreted by a computer. For example, the computer-readable recording medium may be Read Only Memory (ROM), Random Access Memory (RAM), a magnetic tape, a magnetic disc, flash memory, an optical data storage device, etc.

A machine-readable storage medium may be provided in the form of a non-transitory storage medium, wherein the term 'non-transitory' simply means that the storage medium is a tangible device, and does not include a signal (e.g., an electromagnetic wave), but this term does not differentiate between where data is semi-permanently stored in the storage medium and where the data is temporarily stored in the storage medium.

So far, the disclosed embodiments have been described with reference to the accompanying drawings. It will be understood by one of ordinary skill in the technical art to which the disclosure belongs that the disclosure can be embodied in different forms from the disclosed embodiments without changing the technical spirit and essential features of the disclosure. Thus, it should be understood that the disclosed embodiments described above are merely for illustrative purposes and not for limitation purposes in all aspects.

What is claimed is:

1. A driving assistance apparatus comprising:

one or more sensors configured to sense at least a portion of an environment of a vehicle; and a processor connected to the one or more sensors, wherein the processor is configured to:

acquire information about a current curvature of a traveling lane, on which the vehicle is currently traveling, based on sensor data of the one or more sensors;

verify validity of the information about the current curvature of the traveling lane by comparing the information about the current curvature of the traveling lane and information about a previous curvature of the traveling lane on which the vehicle previously traveled, during execution of a lane keeping assist function of the vehicle; and control the vehicle based on a result of verification of the information about the current curvature, wherein the processor is configured to:

when the information about the current curvature of the traveling lane is verified to be valid, output one or more signals for controlling the lane keeping assist function to a steering device of the vehicle based on the information about the current curvature of the traveling lane; and when the information about the current curvature of the traveling lane is determined to be invalid, selectively control the vehicle to output one or more signals for controlling the steering device based on information about a current curvature of an opposite traffic lane traveling in an opposite direction to the traveling lane of the vehicle, or stop execution of the lane keeping assist function.

2. The driving assistance apparatus of claim 1, wherein the processor is configured to, when a difference between a current traveling lane curvature value of the current curvature of the traveling lane and a previous traveling lane curvature value of the previous curvature of the traveling lane is smaller than a predetermined first error reference value, verify the information about the current curvature of the traveling lane to be valid.

3. The driving assistance apparatus of claim 1, wherein the processor is configured to:

when the information about the current curvature of the traveling lane is determined to be invalid, verify validity of the information about the current curvature of the opposite traffic lane; and when the information about the current curvature of the opposite traffic lane is verified to be valid, output the one or more signals for controlling the steering device based on the information about the current curvature of the opposite traffic lane.

4. The driving assistance apparatus of claim 3, wherein the processor is configured to, when a difference between a current opposite lane curvature value of the current curvature of the opposite traffic lane and a previous opposite lane curvature value of a previous curvature of the opposite traffic lane is smaller than a predetermined second error reference value, verify the information about the current curvature of the opposite traffic lane to be valid.

5. The driving assistance apparatus of claim 4, wherein the processor is configured to, when the information about the current curvature of the opposite traffic lane is verified to be valid, replace the current traveling lane curvature value with the current opposite lane curvature value and output one or more signals for controlling the steering device based on the current traveling lane curvature value replaced with the current opposite lane curvature value.

6. The driving assistance apparatus of claim 5, wherein:

the one or more sensors include a camera, the information about the current curvature of the traveling lane includes information about a curvature of the traveling lane in a current image frame at a current time point acquired through the camera, and the information about the previous curvature of the traveling lane includes information about curvatures of the traveling lane in a predetermined number of previous image frames acquired before the current image frame.

7. The driving assistance apparatus of claim 6, wherein the processor is configured to:

when the information about the current curvature of the opposite traffic lane is verified to be valid, store a curvature value of a curvature of the traveling lane in an image frame acquired immediately before the previous image frames as a reference value in a memory;

determine whether a result value reflecting a predetermined margin value in an average value of the current opposite lane curvature value and the reference value is smaller than or equal to a previous traveling lane curvature value of the previous curvature of the traveling lane;

when the result value reflecting the predetermined margin value in the average value of the current opposite lane curvature value and the reference value is less than or equal to the previous traveling lane curvature value, revert the replacing of the current traveling lane curvature value with the current opposite lane curvature value and output one or more signals for controlling the steering device based on the current traveling lane curvature value which is the current traveling lane curvature value before being replaced with the current opposite lane curvature value; and when the result value is larger than the previous traveling lane curvature value, re-perform an operation of replacing the current traveling lane curvature value with the current opposite lane curvature value.

8. The driving assistance apparatus of claim 7, wherein the processor is configured to delete the margin value stored in the memory in response to the one or more signals based on the current traveling lane curvature value which is the current traveling lane curvature value before being replaced with the current opposite lane curvature value.

9. A method of controlling a driving assistance apparatus, the method comprising:

acquiring information about a current curvature of a traveling lane, on which a vehicle is currently traveling, based on sensor data of one or more sensors of the vehicle;

verifying validity of the information about the current curvature of the traveling lane by comparing the information about the current curvature of the traveling lane and information about a previous curvature of the traveling lane on which the vehicle previously traveled, during execution of a lane keeping assist function of the vehicle; and controlling the vehicle based on a result of verification of the information about the current curvature, wherein controlling of the vehicle includes when the information about the current curvature of the traveling lane is verified to be valid, outputting one or more signals for controlling the lane keeping assist function to a steering device of the vehicle based on the information about the current curvature of the traveling lane, when the information about the current curvature of the traveling lane is determined to be invalid, selectively controlling the vehicle to output one or more signals for controlling the steering device based on information about a current curvature of an opposite traffic lane traveling in an opposite direction to the traveling lane of the vehicle, or stopping execution of the lane keeping assist function.

10. The method of claim 9, wherein the verifying of the validity of the information about the current curvature of the traveling lane includes when a difference between a current traveling lane curvature value of the current curvature of the traveling lane and a previous traveling lane curvature value of the previous curvature of the traveling lane is smaller than a predetermined first error reference value, verifying the information about the current curvature of the traveling lane to be valid.

11. The method of claim 9, further comprising:

when the information about the current curvature of the traveling lane is determined to be invalid, verifying validity of information about the current curvature of the opposite traffic lane; and when the information about the current curvature of the opposite traffic lane is verified to be valid, outputting the one or more signals for controlling the steering device based on the information about the current curvature of the opposite traffic lane.

12. The method of claim 11, wherein the verifying of the validity of the information about the current curvature of the opposite traffic lane includes, when a difference between a current opposite lane curvature value of the current curvature of the opposite traffic lane and a previous opposite lane curvature value of a previous curvature of the opposite traffic lane is smaller than a predetermined second error reference value, verifying the information about the current curvature of the opposite traffic lane to be valid.

13. The method of claim 12, wherein the outputting of the one or more signals for controlling the vehicle based on the information about the current curvature of the opposite traffic lane includes, when the information about the current curvature of the opposite traffic lane is verified to be valid, replacing the current traveling lane curvature value with the current opposite lane curvature value and outputting the one or more signals for controlling the steering device based on the current traveling lane curvature value replaced with the current opposite lane curvature value.

14. The method of claim 13, wherein:

the one or more sensors include a camera, the information about the current curvature of the traveling lane includes information about a curvature of the traveling lane in a current image frame at a current time point acquired through the camera, and the information about the previous curvature of the traveling lane includes information about curvatures of the traveling lane in a predetermined number of previous image frames acquired before the current image frame.

15. The method of claim 14, wherein the outputting of the one or more signals for controlling the steering device based on the information about the current curvature of the opposite traffic lane includes:

when the information about the current curvature of the opposite traffic lane is verified to be valid, storing a curvature value of a curvature of the traveling lane in an image frame acquired immediately before the previous image frames as a reference value in a memory;

determining whether a result value reflecting a predetermined margin value in an average value of the current opposite lane curvature value and the reference value is smaller than or equal to a previous traveling lane curvature value of the previous curvature of the traveling lane; and when the result value reflecting the predetermined margin value in the average value of the current opposite lane curvature value and the reference value is less than or equal to the previous traveling lane curvature value, reverting the replacing of the current traveling lane curvature value with the current opposite lane curvature value and outputting one or more signals for controlling the steering device based on the current traveling lane curvature value which is the current traveling lane curvature value before being replaced with the current opposite lane curvature value.

* * * * *